United States Patent [19]

Peters

[11] 3,865,953
[45] Feb. 11, 1975

[54] PACKAGING EMBOSSED-SURFACED BUTTER AND MARGARINE

[76] Inventor: Leo Peters, 750 Plymouth Rd. S.E., Grand Rapids, Mich. 49506

[22] Filed: May 24, 1972

[21] Appl. No.: 256,411

Related U.S. Application Data

[63] Continuation-in-part of Ser. No. 121,010, March 4, 1971, Pat. No. 3,758,312, and a continuation-in-part of Ser. No. 236,463, March 20, 1972, Pat. No. 3,835,224.

[52] U.S. Cl. ............... 426/124, 206/461, 206/471, 206/499, 206/521, 206/526, 426/119, 426/130, 426/396
[51] Int. Cl. .................... B65b 25/06, B65b 23/00
[58] Field of Search ....... 99/179, 178, 180, 171 MP, 99/171 TC, 171 CT, 180 R, 137, 138; 206/78 B, 80 A, 461, 471; 426/106, 108, 110, 115, 119, 124, 130, 392, 394, 396, 414

[56] References Cited
UNITED STATES PATENTS

| | | | |
|---|---|---|---|
| 1,500,611 | 7/1924 | Ewen | 99/137 |
| 2,688,557 | 9/1954 | Peters | 99/179 X |
| 2,813,799 | 11/1957 | Bender et al. | 99/178 |
| 2,931,493 | 4/1960 | Pfonl | 206/78 B |
| 3,095,967 | 7/1963 | Harvey, Jr. | 206/45.33 |
| 3,104,172 | 9/1963 | Wizelman | 99/180 R X |
| 3,122,441 | 2/1964 | Smith | 99/180 R |
| 3,249,217 | 5/1966 | Irving | 206/78 B |
| 3,256,975 | 6/1966 | Puente | 206/328 |
| 3,317,326 | 5/1967 | Peters | 99/171 CT |
| 3,398,000 | 8/1968 | Peters | 426/119 |
| 3,529,976 | 9/1970 | Peters | 99/179 |
| 3,758,312 | 9/1973 | Peters | 206/521 X |

Primary Examiner—Frank W. Lutter
Assistant Examiner—Steven L. Weinstein

[57] ABSTRACT

Packaging multi-cubic-dimensioned embossed surfaces of butter or margarine underneath, within, and in spaced relationship away from a generally shape-conforming, but non-surface-conforming, pre-formed cover or cap.

11 Claims, 15 Drawing Figures

PACKAGING EMBOSSED-SURFACED BUTTER AND MARGARINE

RELATED APPLICATION

This ia a continuation-in-part of my prior copending applications entitled "Packaging Embossed-Surface Butter and Margarine," Ser. No. 121,010, filed Mar. 4, 1971, now U.S. Pat. No. 3,758,312 and "Tear-Strip Sealing Structure And Method For Blister Packages,"Ser. No. 236,463 filed Mar. 20, 1972, now Pat. No. 3,835,224.

BACKGROUND AND SUMMARY OF INVENTION

For purposes of illustration this invention will be described with butter, but with the understanding that it is also applicable to other foods that have certain similar physical and marketing characteristics, such as margarine, semi-firm cheeses and cheese-foods, and ice-creams.

This invention is concerned solely with the problem of protecting embossed (upraised) surfaces on butter while such butter is in transit from packaging plant to the point of end use. This problem is pecucliar to such a food because of the peculiar set of circumstances and conditions that influence its saleability and useability. No other type of food (except those mentioned above) has comparable soft, frangible and sticky surfaces; comparable changes in temperature levels during transit from time of packaging to time of end use; and/or comparable practices under which the final consumer dispenses them from their packages.

The embossed items within the field of this invention embrace both the fractional-ounce sizes served in restaurants, and the fractional-pound sizes served in homes. This invention has special and particular merit for these foods when they are to be packaged and delivered to the point of consumption with their embossed surfaces bare, i.e., without any surface-conforming liner or wrapper clinging to and/or covering their entire embossed surfaces. When these surfaces are bare, the three product conditions of softness, frangibility, and stickiness present interrelated packaging problems that are especially and particularly difficult to overcome, because each one influences and increases the difficulites in overcoming the individual difficulties of the others. It also has merit when embossed surfaces are covered with a wrapper film so thin and soft that is is paractically devoid of any resilience and/or stiffness (such a wrapper is described in my U.S. Pat. No. 3,529,976). Then the two product conditions of embossed surface softness and frangibility are the difficulties to be overcome by this invention.

At the usual varied temperatures under which butter is transported, stored, sold, and then dispensed at point of end use, the inherent nature of butter, and especially of multi-cubic-dimensional-surfaced embossed butter, is such that it is both sufficiently soft so that relatively light pressures can deform its surfaces; sufficiently sticky so that light pressure contacts can cause it to adhere to its package walls; and sufficiently frangible so its surfaces can easily break apart by adhering to its package walls rather than cohering to its own body. These are the conditions and results that have dictated the smooth-surfaced, nestable shapes used to package butter in the past, because such surfaces and shapes minimize and/or substantially eliminate the packaging problems that otherwise ensue from the nature of butter with embossed surfaces. But when it comes to the packaging of embossed-surfaced butter that is also bare-surfaced or with a wrapper devoid of stiffness, then all the problems inherent in the packaging of butter are maximized and, at first glance, appear impossible of solution.

Embossed surfaces on butter are old. But, until recent times, this old art had been practiced only as a non-commercially-marketable manual art, performed only at or near the site at which it was consumed. No commercially-practical (i.e., low cost mass production and transportation) methods and/or means had been discovered to produce and transport such surfaces. The crude and expensive packaging required to protect this old art in the past, produced costs that made it commercially prohibitive to transport. It was not until the advent of some of my discoveries, in both methods for producing them as well as commercially packaging them, that, within the past few years, there has been a measurable degree of commercial success for embossed-surfaced butter. During the same time, I also made substantial improvements in the type, fineness, and variety of embossments that can be made on butter surfaces. They are properly described as multi-cubic-dimensioned embossments, and a detailed description of them is given in my U.S. Pat. No. 3,410,699.

The youthful commercial age of my embossed butter is understandable when one is conversant with the numerous problems, in each of three different but associated areas, that required solutions before commercial practicality could be assured. Problems arose in the three areas of (1) production, (2) distribution through the channels of trade, and (3) dispensing from the package at the point of end use. Once the problems of production were solved, the next two groups of problems concerned distribution and dispensing. It is in these latter two areas that this invention is concerned.

The basic problem, and thus the basic objective, in these two areas, at the center of all the associated problems, is to deliver low-cost embossed butter surfaces intact and unmarred to the final consumers' tables; whether that is in restaurants or in homes. This basic objective has the dual responsibility of (1) protecting such surfaces, while in transit from producing plant to consumer, from the damaging effects of weight-bearing and/or impact pressures (whether from the butter itself, or from the package itself, or from pressures exerted from outside the package) and (2) removing (dispensing) them intact from their packages at the point of end use.

In the past I was able to offer the following two basic solutions to the overall basic problem:

1. By covering my entire embossed-area butter surfaces with a thin, stiff, but peelable, and reversible, surface-contacting, surface-conforming, periphery or entire-back supported wrapper while in transit through the channels of trade. This solution recognized, and took advantage of, an axiom in the field of weight-bearing of soft surfaced objects: that for maximum support of the weight of such objects, their surfaces should be spread across as much of the supporting surface as possible. This solution spread my entire embossed surface areas across the entire surface of a supporting, but peelable, film, In order to do this, the supporting film had to be formed into matching surfaces with the embossed butter surfaces, and so;

This solution had the advantages of adding stiffening strength to the embossments, of preventing any of the embossments sticking to any unpeelable package walls, and, because of its thinness, of providing a comparatively effective wrapper removal, easily peelable from the embossed butter surfaces.

While this solution provided definite, and demonstrable, commercial advantages, it also had the disadvantage of requiring the butter to be dispensed from its package and the wrapper to be stripped off at the point of end use; stripped off by people, and under conditions, that rarely are ideal for this operation; and so, with results that are, at best, unpredictable and, at worst, disastrous. Embossed surfaces of butter are highly vulnerable to damage during this unpackaging (dispensing) operation, especially if the wrappers are sufficiently stiff to have functioned in an embossment-strengthening role. Damage can come from room temperatures that cause butter surfaces to soften and/or adhere to its wrappers; and from not following even simple unpackaging and dispensing directions. In addition, when wrappers are peeled off at point of consumption there is always some unwelcome hand contact with a wet and/or oily wrapper and/or damaging hand pressures to the embossed surfaces.

These disadvantages, plus a positive desire for quick, clean, easy, simple, fool-proof package dispensing, have cooperated to create an intense need in the marketplace for embossed butter pat surfaces that are packaged bare, ready-to-serve on the table right out of their packages at the point of end use.

This intense need is peculiar to embossed butter surfaces, in distinction to non-embossed surfaces, because only embossed surfaces are highly vulnearable to surface damage during distribution and at time of dispensing. There is no such pressing need with the conventional level-plane surfaced butter, and so none of this conventional butter is packaged and/or distributed bare-surfaced.

It is an object of this invention, therefore, to more fully fulfill this need than has been possible under prior methods and means, and do this either without the help of a surface-contacting, surface-conforming wrapper, or, at least, with a wrapper so thin and soft (i.e., lacking in the quality of rigidity) as to be practically devoid of stiffness.

To meet this intense need in the past, I was able to offer a second basic solution to the overall basic problem:

2. By structuring embossed surfaces to provide their own protection.

This solution is exemplified in my U.S. Pat. No. 3,253,929 and in application Ser. No. 792,001, now abandoned, each one offering a different structure to function protectively with two bascially different shapes and structures.

This solution was confronted by two in-opposition conditions: (a) that the larger the contact of bare-surfaced embossed butter to rigid package walls, the greater the damage from adhesion of butter to package walls at time of dispensing, and (b) the smaller the contact of such surfaces to such package walls the greater the damage from weight produced pressures while in transit. I solved this two-faceted problem by structuring my pats with certain thickened areas, certain flat non-damageable surfaces, and certain gross-proportioned divisions or valleys between my embossed ridges on which individual pats could rest without damage from their own weights. A surprising parts of this solution was that the basic problem of embossment protection of bare-surfaced butter could be accomplished by such pat structuring, alone; and even more surprising, that it could be accomplished by having the individual pat resting on only a small percentage of the embossed surface.

This solution had the advantage of overcoming the previous disadvantages of having a wrapper that had to be peeled off at point of end use. But, it also brought with it certain disadvantages which limit its commercial applicability: (a) it depends on special (and, therefore, limited design) structuring of the pats themselves to carry the entire burden of protecting the embossed surfaces against mutiliation from the weights of the pats themselves, because (b) it uses conventional, non-shape modifiable, flat-plane-surfaced, and therefore, non-shape-conforming, design-limiting packaging materials in which to package pats. This packaging makes no specifically designed contribution to the design and/or shape of the embossed surface contour per se.

It discloses a bare surfaced pat, one without any embossment-conforming covering, protected against crushing by using flat-walled, non-shape and non-surface-conforming packaging. But actual commerical marketing experience has shown that such packaging is successful only if the weight of the individual pat itself does not exert enough pressure to crush the embossed surfaces. Therefore, such packaging has been successful only with the light-weight embossed pats, those in the 60 to 120 per pound sizes (0.2 oz. to 0.1 oz. weights). When used with many of the heavier fractional ounce pats, of the 40 to 60 per pound sizes (0.3 oz. to 0.2 oz. weights), and then the fractional pound sizes, the problem of protecting bare embossments becomes increasingly severe as the weights increase, and, under prior art, a good solution appeared impossible. This was especially so when the heavier weights have approximately the same fine delicate embossments, but weight from 2 to 40 times heavier than the light-weight pats. The same embossments used on the lighter weights simply cannot carry these heavier weights. That is why, until this discovery, it appeared to be hopeless to try packaging these heavier weight pats bare, i.e., without a surface conforming, or surface-strengthening covering wrapper.

This prior art limited both the range and delicacy of the embossed designs and/or pat weights which can be safely shipped with embossed surfaces bare. It has been unable to safely package bare-surfaced embossed butter in the heavier weight sizes having the same delicacy of designs used in the smaller sizes. The heavier pats have required the more extensive protection and packaging of a contacting-conforming wrapper covering the designs to give them added strength and eliminate their sticking to their package walls. In view of these prior art limitations on heavier weight sizes, it is even a contradiction in terms, when speaking of the heavier sizes, to sepak of "packaged" butter and "bare-surfaced" butter in the name context because: "bare-surfaced" butter would be thought of as non-packaged butter; the kind that is already unpackaged and on a consumer's table. These heavier weights (even with flat plain surfaces) have never been sold bare-surfaced; they at least had a simple wrapper on them. And so to anyone skilled in the art, it has appeared incomprehensible that heavy-weight delicately-embossed butter could be packaged and transported with bare surfaces. My prior experience indicated the extend to which modifications in the embossment structure of the pats themselves can serve to protect bare embossed surfaces, and that, in turn, indicated that if further progress was to be made, both in the heavier weights and in the more extensive designings, it had to come from some other direction.

Experiences with the prior art also indicated that for the most successful use of embossed butter at the point of end use, i.e., where the final consumer dispenses butter from its package preparatory to consumption, that practically all of the restaurant trade, and a substantial portion of the home trade, desire embossed butter surfaces naked of any covering-of-the-surface wrapper. They desire it with embossed surfaces already stripped bare and devoid of any contacting and surface-conforming liner or wrapper, or, at least, with only an extremely thin, soft, non-embossment-strengthening wrapper that is peelable from the butter with practically no adhesion resistance.

Thus, from the prior art, it appeared necessary to recognize (a) on the one hand, the need to increase (with a conforming wrapper-surfaced butter) weight-bearing contacts over as wide an area as possible to reduce damage from weight-produced pressures, and, on the other hand, (b) to decrease (with a wrapperless bare-surfaced butter) weight-bearing contacts as much as possible in order to reduce damage from butter sticking to package walls. Each need appeared to be a requisite to each one's particular method of packaging; but each need also appeared to be actually non-desirable if applied to the other's method of packaging. From the prior art, it appeared that with bare-surfaced wrapperless butter one cannot both increase and decrease weight-bearing-butter-to-package-wall contacts at the same time, and still achieve the sought for basic objective of this invention. It appeared that if such contacts were increased, then increased damage-producing sticking and adhesion would result at time of dispensing from the package. If these contacts were decreased, then it would be necessary to decrease the number and range of permissible designs, or run the risk of damaging designs too delicate to bear the treatment to which they would be subjected in shipment.

Furthermore, based on prior art, it appeared obvious that if embossed butter surfaces were covered at all, their contacts with their covering package walls should be co-extensive as in my previous covered surface patents. However, if they were bare, or soft-wrapped then their contacts should be kept at a minimum, down around the 1% to 2% of my prior art bare-surfaced embossed pats. It appeared to be completely unlikely, and certainly then, completely non-obvious, that contacting surfaces of bare-embossed butter to package walls could ever reach substantially upwards of 2%; certainly not into the 20% to 30% contact range, and still function effectively against the damaging effects from stickiness and/or weight-bearing.

Yet the market experiences of my prior bare-surfaced embossed butter pats had indicated that if bare surfaced and/or soft-wrapped embossed butter pats were to enlarge their commercial acceptance, this "impossible" (or some other non-obvious) solution to the basic problem had to be found.

Thus it is another objective of this invention to more fully fulfill the need for bare and/or soft-wrapped embossed-surfaced butter with some method and means that does not depend on the surface structuring of the embossments alone, or per se, to achieve a wide range of embossed designs and their use with embossed pats in the heavier weight ranges.

The Need for a New Approach:

The deficiencies in the prior art indicated a pressing need for some new method and/or means for packaging bare-surfaced, and/or non-stiffened-surfaced, embossed butter. To meet this need, and overcome the prior art deficiencies, one is immediately confronted, as described in previous paragraphs, with on the one hand:

1. The need to increase the contacts between embossed surfaces and packages walls over as much surface as possible.

It is axiomatic, in the protection of any surface against pressures from whatever source, that the greater the surface area that can be utilized to bear a given total pressure, the lower the per square inch pressures become. With my embossed butter surfaces, of course, the same principle applies.

The highly frangible nature of the finely delineated multi-cubic-dimensioned embossed designs used on the surface of my butter have upraised lines and edges as fine as 1/64 inch wide at their uppermost and outermost extremities. Such fine delicate detail (and even detail not so fine or delicate) on a food like butter, that is relatively soft and frangible, incurs deformation from the contacts, and/or impacts, normally encountered in the channels of trade, unless protective measures have been provided to prevent such damage; measures such as spreading weight-bearing contacts across as much surface as possible. This technique has been extensively described in my previous inventions on embossed butter surfaces that use an embossment-conforming peelable wrapper for protection in distribution. And, of course, this kind of wrapper protection is also basic in the old conventional art of smooth level plane surfaced butter pats, making them not easily depressible and/or disfigureable under the pressures and/or impacts encountered in distribution because (a) such pressures and impacts are spread across the entire flat surfaces on which they rest, and (b) their surfaces are compact, uninterrupted, and without open spaces, and (c) they rest against each other in tight form-fitting nesting relationship, so their surfaces have no space into which to move and adjust to relieve whatever pressures are present.

However, when the same pressures and/or impacts are exerted against the narrow ridged, open walled, non-compact, bare-surfaced, or soft-wrapped non-nesting shapes and surfaces of embossed pats, the effect can be quickly ruinous. These surfaces are easily crushed and moved, and therefore quickly destroyed under such in transit abuse. With the lighter weight, bare-surfaced embossed pats I have discovered a way to prevent this by special structuring of the pats themselves, but this structuring also limited the range of useable embossed designs.

So, while the need to spread the weight bearing contacts between embossed butter surfaces and package walls is imperative, and the principle for doing this cannot be ignored, we have on the other hand:

2. The need to decrease surface contacts as much as possible. Thus, on the one hand, the frangible nature of my embossed-surface designs appeared to require protection against pressures on their finest details by spreading these pressures over as much of the bare embossed surface as possible, while (contradictorily) on the other hand, the more adhering contact these surface designs have with non-design-conforming package walls, which normally are relatively rigid and non-peelable, the greater the possibility of the embossments being fractured and torn apart as the walls are pulled away from the butter. As a matter of fact, package walls that are in complete, entire-surface contact with embossed butter surfaces, must be flexible and peelable, as we have seen in my prior inventions. They cannot (without breaking the embossments) simply be pulled away and/or lifted off and/or away. With embossed butter that must be removed from such completely contacting, completely conforming wrappers, the removal can only be done by a peeling action, and only under carefully controlled conditions; conditions not subject to the vagaries of the human element or the time and temperature uncertainties of kitchen conditions. That is why embossed surfaced butter pats are most successfully marketed if they can be packaged without an embossment-conforming, completely-adhering wrapper and/or package walls, and thus eliminate the unpackaging (dispensing) hazards encountered at point of end use.

Thus, a further, combined, and more difficult objective, one of interrelated but contradictory aspects, is to provide a method and means for (a) increasing weight-pressured, butter to package-wall, contacts, over as much embossed surfacing as possible to reduce the per square-inch weight-bearing pressures to a minimum, while on the other hand, and at the same time, (b) decreasing such contacts so they do not extend into detail conforming, co-extensive, adhering contact with the entire embossed surfaces.

The prior art had reached an impasse in the extent to which embossed structures of bare butter pats could be altered and modified to meet the functional protection-requirements for their safe transportation. As the need for a packaging method and means to meet the protection requirements of heavier pats, and an enlarged variety of embossing designs, became more urgent, the only approach to accomplish this appeared to be in the packaging itself; and in some kind of wrapperless bare-surfaced butter packaging, which would permit an increase in the surface-protecting function obtainable from an increase in the surface-to-surface contacts between embossed surfaces and their package walls.

It is another general objective of this invention, therefore, to offer a new method and means for the protective packaging of the heavier-weight and more delicately embossed pats; one that will considerably enlarge the range of shapes and designs that can be used for embossing butter surfaces, and that will enable easy modifications to be made in the packaging itself to accommodate whatever structure, shape, and/or surface design that is present in any particular butter pat; yet within a one shape modification provide the necessary protection for a large number of different surface designs. More specifically, this objective is designed to provide a package that is structured to accommodate itself to the pat structure rather than vice versa as was the case in my previous bare-surface pat inventions. Here the objective is for a package that is easily modifiable, so that with a single modification of the package walls one can increase butter-surface to package-surface weight-bearing contacts to suit a variety of embossed surfaces on a single general shape, rather than have a variety of pats and surfaces modified to suit a single package, and/or general shape.

DEVELOPMENT OF THE INVENTION

Experiences with Modifiable Packages

Probably the most easily shape-modifiable packages in today's packaging art are those made from thermoformed plastics. Within the general art of plastic thermoforming, there is a related and functionally-overlapping group of packaging methods variously known as blister, bubble, and/or shell packaging. All of them have one or more of the following characteristics in common, and all of the methods of forming and/or preforming these packages use these common characteristics to the advantage of the products packaged: 1. A relatively rigid plastic covering that is relatively non-flexible and therefore non-reversible.

If the packaged product is hard and heat imprevious (i.e., can withstand the pressures and heats of thermoforming) it is used as the male die around which a female blister is formed. if the product is hard but easily breakable under the pressures of thermoforming (like some light bulbs), the female blister will be preformed to the detailed surface conformity of the product, and the product thus nested with (and within) the blister.

These packages are then finished by using a substrate plate or base to which, or around which the blister is sealed, attached, and/or locked to keep the packaged product in tight, immobile, surface-contact with the formed blister covering. Such attachments to such substrates then later require the blister and/or substrate to be broken, ripped, bent, and/or twisted in order to separate the contents from the package.

The purposes for this type of packaging include: protection of the whole product against breakage and scratching in shipment, visibility and immobility within the package while on display, and protecting the product against dirt, theft, and direct handling.

2. If the product is soft and/or fluid, or does not have a uniquely identifiable shape or surface independent of its package, then: These packages are used simply to encapsulate fluid-fillable products; products that adhere to the package walls, and can only be removed by pouring or digging them out, as, e.g., with the well-known individual-portion jelly cups, or "soft" margarine tubs. The products so packaged have no surface identities apart from their packages; and protection against surface deformation is not an objective of this packaging.

In unique distinction from the products packaged in these prior art blister-type packages, embossed surfaced butter:

1. Is not hard or heat impervious. It cannot be used as a forming die for a thermo-formed blister because it would be destroyed under the pressures and/or heats of such thermoforming.

2. Cannot be in tight, immobile, adhering, surface-conforming contact with any pre-formed, inflexible, non-reversible, non-peelable cap or covering.

3. Cannot be sealed and/or locked within its package in such a manner that, in order to remove it, the package must be mutilated to such an extent that embossed butter surfaces within it would also be mutilated, or, for practical marketing purposes, it becomes a time-consuming effort to avoid mutilation.

4. Is soft, sticky, and frangible and has a surface that must remain uniquely identifiable from any rigid packaging used to pack it.

5. Must have package protection that seeks solely to protect its surfaces against any kind of pressured contacts that can in any way indent them, stick to them, or break them apart during shipment and/or dispensing at point of end use.

None of the preceding items 1. through 5. is a concern of prior-art blister packaging.

The prior-art practices and the known characteristics of butter indicated that the commonly-used, surface-conforming, thermoformed, blister-type package could not be used for embossed butter. Such packaging could provide immobility and structural re-inforcement for all the frangible delicate detail of butter embossments; but there would be no way to separate the embossed surfaces from the package without destroying the former. The stickiness of the butter to the package walls would prevent easy and damage-proof dispensing of embossed butter from such a package. The cubic-dimsioned embossed surfaces would become so firmly stuck to their aligned cubic-surface-conforming, non-peelable, blister that the butter would be either extremely difficult or impossible to remove intact from its blister; and if and when it did come out, the embossed surfaces would be commercially ruined; both small and large areas of the embossed butter surfaces would remain clinging to the blister, having broken loose from the main body of the butter.

The net result has been that, to date, no butter, or any similar product, requiring delicate, cubic-detailed, embossed-surface, protection and surface-intact removal from its package, has been packaged bare in a blister-type package.

With a blister-type package formed into total or partial conformity with the detailed configuration of a bare embossed butter surface having been ruled out as a practical packaging method by those skilled in the art; a blister-type whose surface was not in conformity with the detailed configuration of an embossed butter surface appeared to be even further away from a practical commercial possibility.

It is true that in my co-pending application Ser. No. 792,001 I am able to use only 1% of an embossed area on which to rest an embossed pat in a package that is rigid and hard-surfaced. But this 1% is a flattened, and-/or grossly-structured, area, especially designed and located for weight-bearing; and because of this, restrictive for design purposes.

By contrast, if all the outermost ridges of an embossed butter surface were left relatively sharp, thin, and delicate, these outermost edges, in many instances, would not comprise much over a few percentage points of the total-embossed-area surfaces. This would mean, based on past experiences, that a package wall would have to be formed that would be in almost perfect alignment-contact with the entire combined exposed area of these outermost edges, if the weight of the pat is to be adequately supported and thus the embossments adequately protected. But with actual production variations of the same designs, in such a frangible item as embossed butter that has been stripped out of its forming die, it appeared highly unlikely that a thermoformed blister-type package could be formed to accommodate such variable contact points and thus provide an accumulated total area for contact sufficient to support the weight of heavy pats.

It further appeared unlikely that: (1) even if a 1% accumulation of outer area would be sufficient to supply weight-bearing strength to support heavy-weight delicately-embossed pats, it would be (2) highly unlikely that all this area could, or would, be in actual contact with package walls at any time to bear weight, and furthermore (3) even if these uncertainties could be resolved, it would require a special blister-type cover for each individual embossed-design surface, which, in turn, would require costly, and therefore commercially undesirable tooling for packaging.

In view of these uncertainties and costs, it appeared obvious that to bear any weight-produced pressures, these delicate embossed surfaces would require a sizeable increase over the miniumu 1% butter-to-package contacts of my previous invention, if the normal surface-mutilating-type abuses encountered intransit were to be avoided. But, on the other hand, experience had indicated that if such an increase of butter-to-package contacts were made with even a partial embossment-conforming blister-type package wall the softness, frangibility, and the stickiness of the embossed bare surfaces would cause them to break away from their own body as the unpeelable, blister-type, surface-conforming package walls are pulled away.

Thus, an impasse had been reached in the development of the art: an increase in butter-to-package contacts was needed, but experience had indicated that such an increase would also be ruinous for embossed butter in rigid packages. However, the principle of spreading weight-bearing and/or impact pressures, by increasing butter-to-package contacts over as wide an area of my bare embossed surfaces as possible simply could not be disregarded; rather it became incumbent on the art to find a way to decrease its application to such an extent that a commercially acceptable minimum of surface disturbance would result under whatever abuses are encountered in transit and at the point of dispensing; and do so without requiring any special structuring of the embossed designs themselves. This objective, therefore, required that the embossment contacting portion of the package alone be modifiable to produce more extensive and/or less adhering-type of weight-bearing contacts than my hitherto bare-surfaced-embossed-pat packaging produced, but never to the extent, or of a type, that these contacts would become coextensive with, and/or in surface-conformity to, the cubic dimensions of any of the embossed surfaces. The base, or plate portion of the package, contacting only the non-embossed flat base portion of the pat need not be modifiable because the base portion of the pat remains the same regardless of modifications in the embossed portion.

Thus, it is a further objective to provide a modifiable (pre-thermoformed blister-type) package-covering for (1) spreading weight-pressured, butter-to-package contacts, over as much embossed surfacing as possible to reduce crushing pressures to a minimum, while, on the other hand, and at the same time (2) do so without extending such contacts into detail-conforming, coextensive, adhering contact with the cubic dimensions of the embossed surfaces. And do so:

1. With no more than 25% of the Bare Embossed or Soft-Wrappered Surfaces ever contacting package walls. The contradictory, self-defeating, maximum weight-spreading, but minimum surface-contacting, objectives appeared at first to be irreconcilable because even a partial embossed-surface-conforming blister-type covering failed to pull free and clean from bare embossed surfaces under conditions that would be encountered in commercial use. It was at this point that a simple, observable, but until then unnoticed, characteristic of my embossed butter surfaces that was non-obvious, insofar as its weight-bearing ability was concerned was by happenstance discovered. I noted that the narrow, outermost, most delicate, most frangible ridges and areas of my finest embossments would never comprise more than about 25% of my total multi-cubic-dimensioned embossed surfaces, and that it was these delicately-ridged limited-area surfaces alone that would have to be in contact with my package walls if these walls did not conform to the detailed cubic definitions of my multi-cubic-dimensioned surfaces. These were the points that would have to bear whatever pressures or impacts that would be exerted during shipment if a thermoformed blister-type cap or cover was to be at all useable for embossed butter. Past experiences and reasoning had led to the conclusion that the more of such delicate points that were present in my embossments and in contact with their package walls, the more difficulty there would be in preventing embossment damage intransit.

But then in actual experimentation two surprising discoveries were made: (a) that 25%, and even down to less than 10%, of the outermost delicate surfaces, depending on the size and weight of pat involved, of any embossed and baresurfaced butter pat could safely be in pressure-bearing-contact relationship with, and thus be safely packaged within, a blister-type package provided (b) that a blister that was generally shape-conforming but not surface-conforming (and, surprisingly, the less surface-conforming, the better) would safely package surfaces of embossed butter. Such a protecting package cap or cover should substantially conform to the overall shape (not the embossed detail) of the embossed surfaces, so that there is a sufficient cumulative quantity of the outermost delicately embossed points in contact with the package walls to withstand whatever pressures that might be encountered in transit.

It is therefore an object of this invention to harmonize the contradictory aspects of the two preceding objectives so that, on the one hand, contact of the uppermost, outermost, and most delicate edges of my embossed surfaces, with their package walls will be an extensive as necessary to bear the in transit pressures without deforming; but, on the other hand, the package structure not be modified to the extent that more than 25% of the total cubic embossed surfaces are in contact with the package walls at any one time. Thus, this objective is designed to provide a package that can be modified to render to each, single-shaped but plural-designed-surfaced, pat within its confines a shape that cooperates with the shape and surface design of each one of the numerous-designed embossed pats it encloses, and both maximizes embossment weight-bearing ability and minimizes embossment adhesion to the package walls; that provides substantial shape conformity, but avoids substantial surface conformity.

2. With Walls That Will Not Obstruct Passage of Air.

In the process of trying to harmonize the contradictory aspects of the preceding objectives, another surprising discovery was made: namely, the presence of the known phenomena that surface tensions and frictions between two contiguous, contacting, similarly-faced surfaces can be decreased and relieved by opening channels between such surfaces. The naturally-existing channels, grooves, and/or spacings provided by embossed surfaces per se, provide, in varying degrees, air passages, and thus air and surface-tension relief, that would not otherwise exist between the butter-to-package contacting surfaces. Because of this, the pull-away, even from contacting areas of greater extent than just the areas made by small-ridges-contact of my embossments, is cleaner, easier, and with less butter adhering to the package than would be the case without such air relief.

The presence of my embossed surfaces within a shape-conforming, but non-surface-conforming, cover, therefore, represents a type of product-to-package-wall contact that actively, even though it is a passive structure, cooperates with the walls to relieve surface-to-surface adhesion at time of dispensing. The overall "surprising" discovery that blister-type packaging can safely be used for embossed butter, then, is in part due to the presence of a phenomena that fortunately happens to be a natural characteristic of an embossed surface; one which it will naturally exercise itself, if not interrupted by obstructing package walls. Awareness of the role played by this naturally-present phenomena in my embossed butter is, in itself, another surprising discovery because the structural cooperative-ability of this phenomena in the case of embossed butter surfaces has obviously been in existence all the time; yet all this time its application to embossed butter within a blister-type package has not been at all obvious to those skilled in the art.

It therefore, becomes another objective to provide package walls that will not obstruct the passage, or naturally provided air-channels, of air between the contacting embossed surfaces of butter to the inside blister-package walls.

3. With a nesting encasement of each individual embossed surface.

A further problem arises with embossed-surfaced butter pats, that is not present with the conventional flat-surfaced non-embossed pats, i.e., that embossed pats cannot be nested. There are no sufficiently co-extensive flat areas on these embossed surfaces that can be laid one upon the other, and no square corners and/or precise opposing angles or sides on these surfaces that can fit tightly together for natural protection against pressures and weights. Also, the embossed butter surfaces are just able to protect themselves against their own individual weights and none other. They cannot even be allowed to be in bare-embossed-surface to bare-embossed surface contact with each other in the same shipping container without danger of becoming stuck together and their surfaces being mutually destroyed thru such contact.

Because of their inherent stickiness, and the added weights from adjacent pats if they were packed in a loose, non-separated, manner in the same container, they would become either stuck together in an embossment-breaking and/or mashed together in an embossment-cushing condition.

Yet, the elementary fact that nesting, by distributing weight-bearing over more surface-contact areas, can provide excellent protection for nesting surfaces, provided another highly desirable and important objective in my search for a commercial method and means of packaging that would provide extended protection for the embossed surfaces of my pats. This objective becomes especially important for weight distribution when my embossed pats are in shipment upside down (embossed side down). It is at such a time, and in such a condition, in the commercial life of these pats that the function of pat-to-package nestability can provide greatly enhanced protection for embossed butter surfaces. A shape-conforming, but non-surface-conforming, easily modifiable package like a blister package can offer both this function and this protection provided the several other structural specifications of this invention are also present.

Thus, a further objective is to provide a method and means that will give each embossed-surfaced pat individual protection against any and all in transit pressures and/or weights other than the pressure from its own individual weight, by providing a package that produces a cooperative nesting structure for embossed butter surfaces that is shape-nesting but not surface-nesting; by providing a package structure that will offer a shape and surface into which each pat can nest only its embossed-surfaced shape, but will not offer a shape or surface in which the cubic dimensions of the embossed surfaces of the pats can nest; to provide a cooperative pat-packaging method and means that will allow nesting for an embossed shape, but deny nesting for the cubic embossed detail within an embossed shape's surfaces.

4. With an air-space between pat-surface and blister wall.

A danger in the packaging of embossed-surfaced butter pats is that of packaging such pats in too close confinement with and within their package walls. Because of slight, but significant, volume variations with butter pats of even the same shape and design, due to (a) variable specific weight and volume differences in butter ingredient content, (b) the inability to tailor commercially-practical, lowcosting, packaging materials to precisely accurate dimensions called for in package specifications, and (c) the practical impossibility of fitting imprecise-specificationed embossed butter surfaces with imprecise-specificationed packaging materials, it is necessary that some "head-room," "floating space," pat-mobility room, and/or open area be provided between the embossed butter surfaces and the package walls, so that in the process of packaging, the embossed surfaces and the package walls will not come together in a tight embossement damaging contact. Some tolerance must be allowed between the outermost dimensions of mass-produced embossed butter surfaces and the inside, mass-produced, non-embossment-conforming, package dimensions within which the delicate, frangible, embossed, surfaces are to be packaged in order to prevent the package from squeezing down on, and flattening, the embossed surfaces.

It is therefore, another objective of this invention to provide a package for individual, mass-produced, bare-embossment-surfaced butter pats that will allow sufficient space between the embossed surfaces and the inner walls of their packages so that the embossed surfaces will not be subjected to package-wall produced pressures during and after the packaging operation.

An associated problem arises from the preceding objective, namely, the effect of impact-produced pressures on any object that is permitted some mobility within the confines of a package. The greater such space, the greater the distance the butter can travel and the greater the pressures if and when a violent impact, such as is frequently encountered in transit, takes place. The lesser the space the greater the danger of impact-produced distortions of the package walls being transferred to tight-fitting embossed butter surfaces. So it is necessary to balance out, or compromise, the greater space needed to avoid packaging pressures from too-close-spacing, against the lesser space needed to avoid the unfavorable results from impact pressures. I have found that such spacing is most effective when the distance between the outermost points of the embossed surfaces and the package walls is within the range of 1/16" and 1/4" although this range may be somewhat greater for specific areas of specific surface designs, especially in the heavier weight pats.

It is another object of this invention therefore, to provide a "head space," or distance, between the major areas of embossed butter surfaces and their package walls of approximately 1/16 inch to ¼ inch.

A final objective of this invention is to accomplish all the preceding objectives via a commercially-practical low-cost method and means such as with a pre-thermoformed-plastic, blister-type, substantially shape-conforming, but non-surface-conforming cap or covering for the embossed surfaces of a cube of butter. Such a cover may be made from any material that can be pre-formed, but I prefer any one of the commonly used non-toxic, FDA-approved, thermoformable plastic sheets such as polyvinylchloride, polystyrene, polypropylene, polyethylene, etc., in thickness gauges in the range of 0.005 inches to 0.02 inches. The basic surprising aspect of this invention is the discovery that the natural inherent "obvious" disadvantages and liabilities of (1) bare-surfaced or soft-wrappered embossed butter surfaces and (2) rigid-bodied, hard-surfaced blister-type packages, actually turned out to be non-obvious advantages and assets; that the reasoned and "reasonable" thinking of those skilled in the art had concluded that it was obvious that the embossed surfaces of butter, if packaged without a stiffening wrapper, would preclude, as a commercially practical matter, the use of a hard, non-yielding surfaced, non-surface-conforming, blister-type package, a package that was apparently uncongenial and anti-pathetic to a soft frangible product surfaced like embossed butter; while the non-obvious truth of the matter is just the opposite, namely, that the inside of a non-surface-conforming blister-type package can indeed be a congenial sympathetic, and cooperating contacting surface in which to rest and surface-nest an embossed butter surface.

DETAILED DESCRIPTION OF THE INVENTION

The invention is described in conjunction with illustrative embodiments shown in the accompanying drawng, using bare-surfaced embossed butter, in which.

Figure 1:
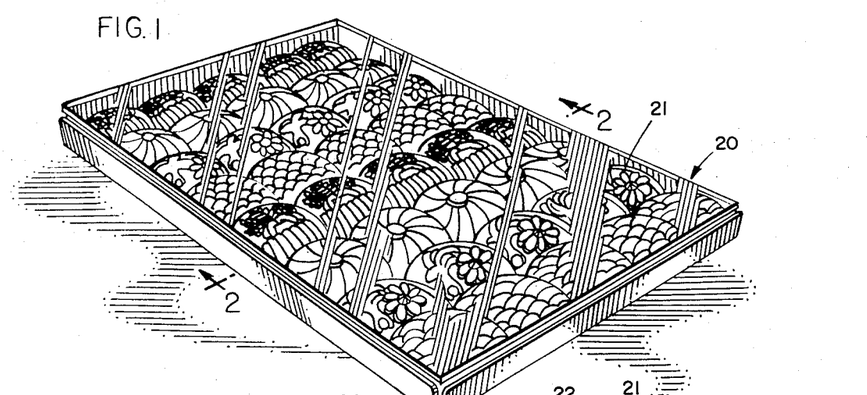
FIG. 1 is a perspective view of packaging for a single layer of relatively small (fractional ounce) butter pats.

In the illustration given in FIG. 1 the numeral 20 designates generally the total package for a plurality of butter pats 21 which are disposed in a single layer. The pats are generally of the shape described in my pending application Ser. No. 792,001, having generally a hemispherical shape. The single layer packaging of FIG. 1 includes a relatively rigid outer container defined by top and bottom walls and four side walls, all embracing a thermoformed blister sheet which envelopes the various pats 21.

Figure 2:
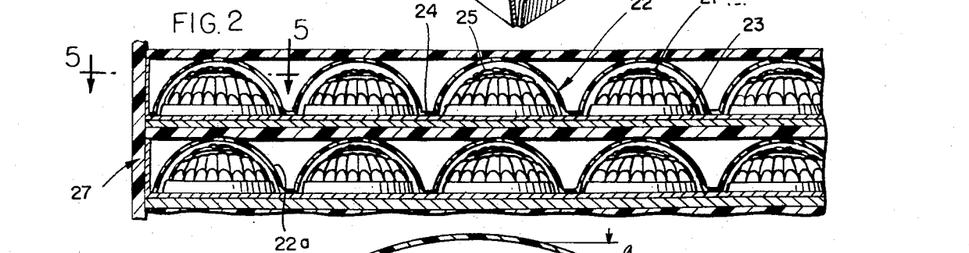
FIG. 2 is a fragmentary transverse section of multiple layer packaging and which corresponds to the showing in FIG. 1 as would be seen along the sight line 2—2 applied to FIG. 1 and except that the pats are seen in elevation.

Usually a plurality of units 20 will be packaged together as is seen in FIG. 2. There the blister sheet is designated generally by the numeral 22 and is seen to be thermoformed to correspond to the outer contour of the various pats, i.e., shaped to provide general conformity to the outer points of the embossments but not conforming to the detail. Alternatively, this can be considered an envelope shaped to conform to the collective shape of the peaks but not the valleys of the embossments.

The actual packaging (besides the blister sheet 22) may take a variety of forms. For example, in FIG. 2, a base plate or sheet 23 is provided for each layer and the pats 21 are positioned on this layer. The blister sheet 22 is shaped to contact the plate 23 between various pats as at 24, thereby providing a stable, spaced apart, non-touching, arrangement between the individual pats. Each blister sheet is sized in its upraised portion to be spaced from the confronting face of the pat as at 25.

Figure 3:
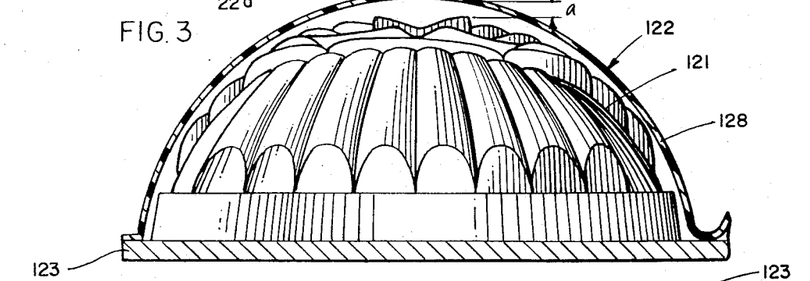
FIG. 3 is a sectional view of a package for a larger pat (about ¼ pound) also utilizing teachings of this invention.
Figures 4, 5:
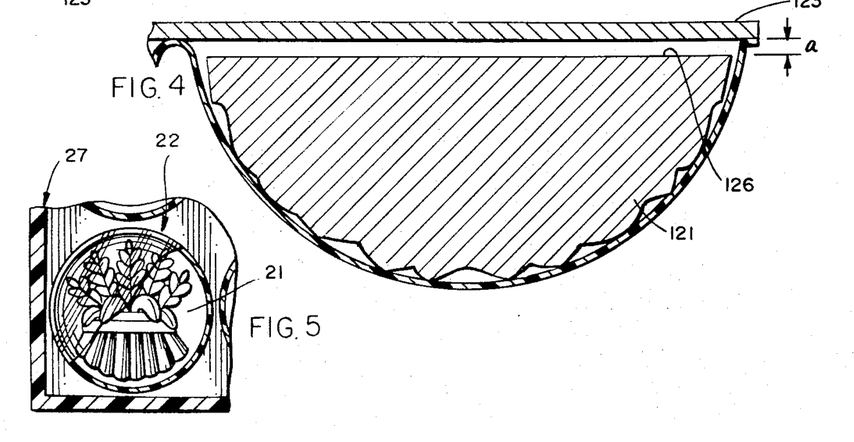
FIG. 4 is a sectional view similar to FIG. 3 but in inverted condition.
FIG. 5 is a top plan view, partially in section of a portion of FIG. 2 such as would be seen along the sight lines 5—5 applied to FIG. 2.

This can be appreciated also from the showing in FIGS. 3 and 4 which illustrate the use of the invention in conjunction with a larger sized butter unit. There the pat or butter form 121 may be of the order of ¼ pound and the blister sheet 122 is seen to be spaced a distance $a$ away from the upper edges of the butter form 121.

This is the initial position but when the packaging is inverted, as may occur during transit, the butter unit 121 can fall away from the base plate 123 (see FIG. 4) so as to develop the spacing $a$ between the bottom 126 of the butter form 121 and the plate 123.

As indicated, a variety of outer packaging forms may be employed. For example, in FIG. 2, a generally rectangular outer carton is designated by the numeral 27 and this includes the usual top, bottom and side walls. The base plate 23 itself may constitute the only separation between an upper layer of pats 21 and the blister sheet 22a covering the next layer of pats below. In one advantageous embodiment of the invention, I provide 15 trays of 40 pats per tray within the carton 27, the container walls ranging from ⅛ inch to ¼ inch in thickness.

Advantageously, the blister sheet 22 may be constructed of a material that is readily pre-formable but I prefer the commonly used, non-toxic, F.D.A. approved thermoformable plastics such as polyvinyl chloride, polystyrene, polypropylene, polyethylene, etc. Exemplary of these is a polystyrene sheet having a thickness of the order of 0.0075 inch, i.e., 7½ mils. This is the thinnest sheet currently available, thicknesses below 7½ mils being available in the form of films. When larger sizes of pats are being packaged, as in the embodiment shown in FIG. 3, slightly greater thicknesses of thermo-formed sheets are used advantageously, of the order of about 15 mils. To a certain extent, the thickness of blister sheet dictates its stiffness and where the packaging comprises a plurality of layers, I utilize sufficient thickness in each blister sheet to insure that the sheet does not deform merely because of the cumulative weight of the superposed layers. In other words, I utilize the blister sheet to protect against deformation arising from shifting of the internal contents but make use of the outer case 27 to protect the overall assembly from disruption by harsh blows.

Each of the pats 21 has a substantial extent of its upper surface covered with multi-cubic dimensioned embossments. I have found that for optimum esthetic appeal, the depth of the valleys relative to adjacent embossments should be less than about 20% of the maximum height of the pat. Further, consistent with the foregoing, at least about 50% of the upper surface of the pat should be covered with the multi-cubic dimensioned embossments. This can be appreciated from a consideration of FIG. 5 where the blister sheet 22 has been partially broken away to show the perimetric contact of the thermo-formed blister with the base plate. Also, the showing in FIG. 5 reveals the extent of the embossments provided on the top surface of pat 21.

In the practice of the invention, I prefer to package pats in the same package which have generally the same contour of an envelope so that the development of the blister sheet 22 utilizes a minimum of different dies.

Referring now to the invention embodiment seen in FIGS. 3 and 4, it will be noted that the pat 121 is substantially larger than the pats 21 of FIGS. 1 and 2. Also, the blister sheet 122 can incompass one to four pockets 128 therein as contrasted to the relatively large number of pockets 16 provided in blister sheet 22 of the embodiment of FIGS. 1 and 2. Consistent with the showing in FIGS. 1 and 2, the blister sheet 122 of FIG. 3 has planar perimetric portions at its lower periphery which engage the bottom wall 123 of the carton at a line circumscribed by the base periphery of the pat.

Figure 6:
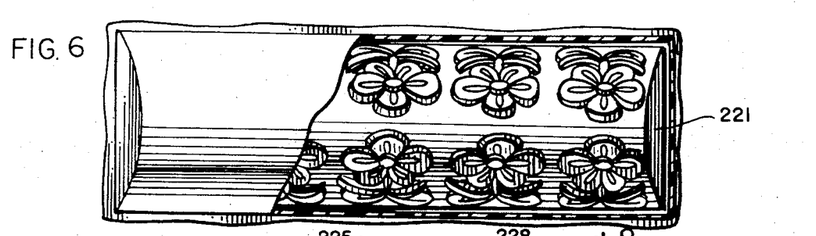
FIG. 6 is a top plan view, partially broken away of a relatively elongated, rounded butter unit which also is packaged according to the teachings of this invention.
Figure 7:
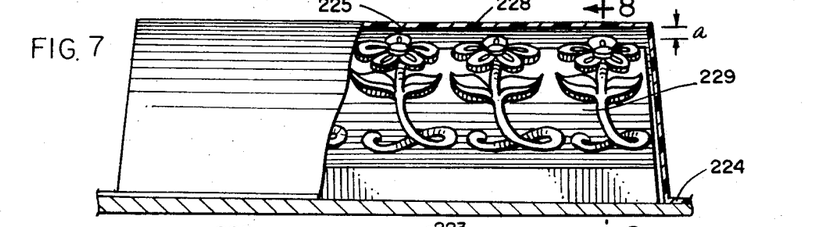
FIG. 7 is a side elevational view, partially broken away of the structure seen in FIG. 6.
Figure 8:
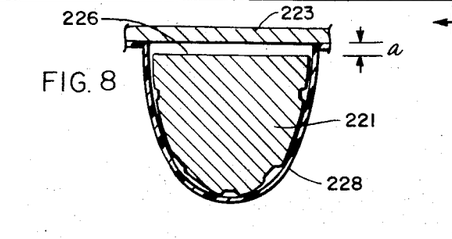
FIG. 8 is an inverted fragmentary cross-sectional view such as would be seen along the sight line 8—8 applied to FIG. 7.

In FIGS. 6-8 another form of butter unit is seen which is also packaged in a blister sheet according to teachings of the invention. The butter unit 221 is relatively elongated and may be of about ¼ of a pound in weight. As can be appreciated from FIG. 8, the transverse section of the butter form 221 is essentially semicircular. The generally semi-cylindrical surface of the butter unit 221 is covered with an embossment as at 229 which in its outermost points as at 225 is spaced from the interconfronting wall of the blister sheet pocket 228 by a space $a$. This can be seen in FIG. 7 and when the unit is inverted as seen in FIG. 8, the bottom wall 226 of the butter form 221 is spaced from the supporting plate 223. At this time, the outermost points of the embossments contact in a non-distorting fashion, the innersurface of the blister pocket 228. Again, the perimeter of each pocket is positioned against the bottom plate as at 225 in FIG. 7.

Figure 9:
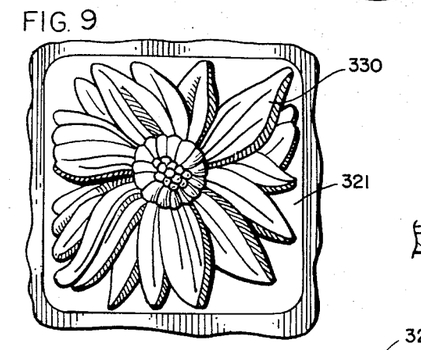
FIG. 9 is a fragmentary top plan view of a generally rectangular, top surface embossed pat incorporated in packaging according to the teaching of this invention.
Figure 10:
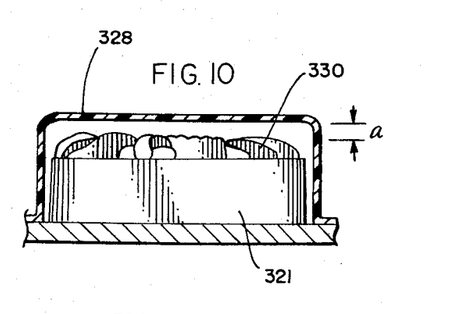
FIG. 10 is a side elevational view, partially in section of the pat of FIG. 9.
Figure 11:
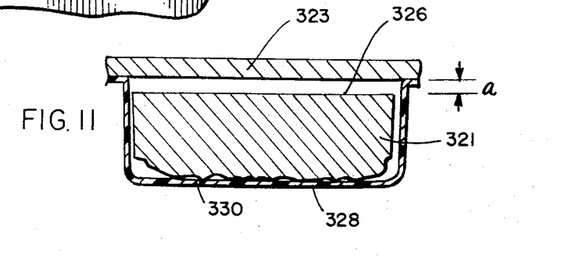
FIG. 11 is a view similar to FIG. 10 but with the package unit in inverted condition.

A still further embodiment of the invention can be seen in FIGS. 9-11. Here the butter pat is generally square in plan as can be seen from the unit 321 in FIG. 9. The upper surface is covered with an embossment 330 which, as can be seen in FIG. 10 is spaced away (by the distance $a$) from the inner wall of the blister pocket 328. Again, when the butter unit 321 is inverted (see FIG. 11), the embossments 330 come into contact with the inner surface of the blister pocket 328 so as to develop the space $a$ between the bottom 326 of the pat 321 and the base plate 323. Again, a variety of outer packaging structures may be employed to protect the butter units 21, 121, 221, or 321 against harsh impacts that might be encountered during travel in commerce. The function of the blister sheet 22 with the various pockets that might be formed therein as at 128, 228, 328 is intended to resist those forces normally encountered during handling, particularly inversion or dropping, so hat the fine delineation of the embossments is preserved notwithstanding the fact that the weight of either one or a plurality of pats must be borne thereby.

Still another embodiment of the invention is shown in FIGS. 12-15, which illustrate a package 420 such as disclosed in my prior copending application entitled "Tear-Strip Sealing Structure And Method For Blister Packages," Ser. No. 236,463 filed Mar. 20, 1972. The package illustrated includes a single generally hemispherical ¼ pound butter pat 421, but the package could be modified to accommodate other shapes and sizes of pats.

Figures 12, 14:
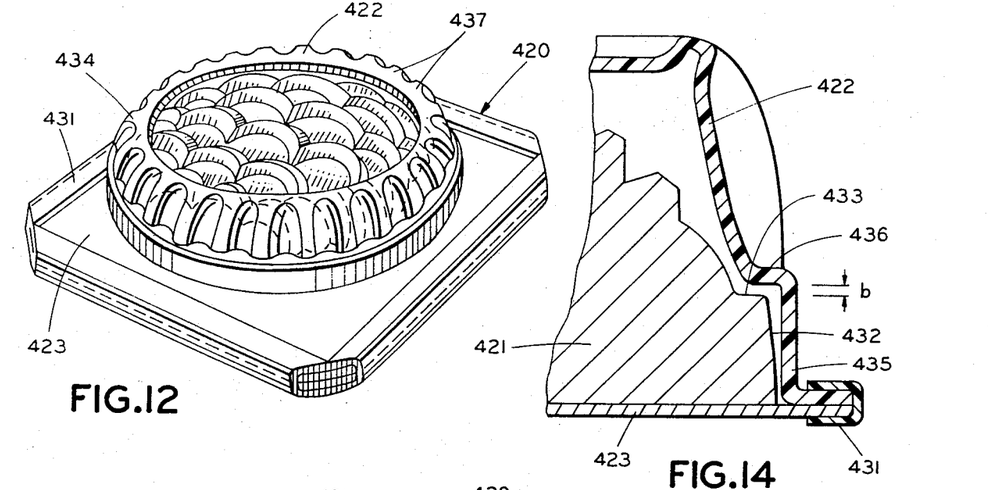
FIG. 12 is a perspective view of a modified package for an individual pat (about ¼ pound)
FIG. 14 is an enlarged fragmentary view of a portion of FIG. 13.
Figure 13:
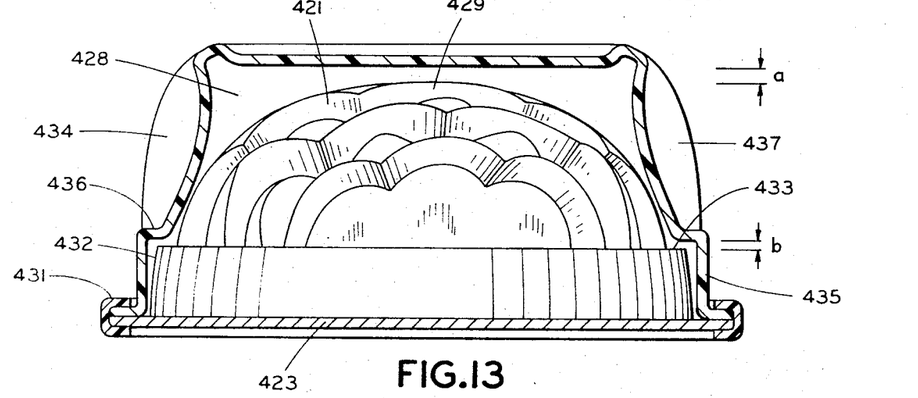
FIG. 13 is a side elevational view partially in section, of the package of FIG. 12.
Figure 15:
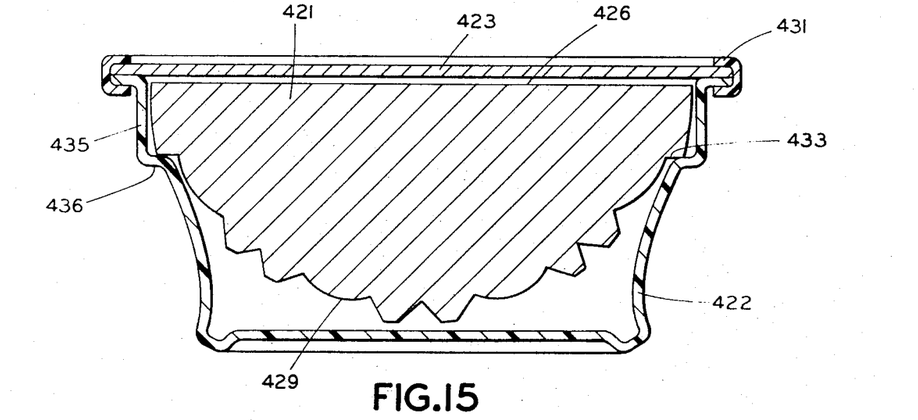
FIG. 15 is a view similar to FIG. 13 but with the package inverted.

The package 420 includes a plastic thermoformed blister sheet 422 and a base plate or sheet 423 which is secured to the blister sheet by adhesive tape 431. The butter pat includes an embossed upper surface 429 and a lower perimetric side wall portion 432 which is joined to the embossed portion by a substantially planar annular shoulder or wall 433. The pat terminates in a flat bottom 426 which is supported by the base 423.

The blister sheet 422 which provides the pat-receiving pocket 428 includes an upper generally dome-shaped portion 434 and a lower perimetric side wall portion 435 which is spaced slightly outwardly of the side wall 432 of the pat and which is substantially concentric therewith. The wall portion 435 is joined to the upper portion 434 by a planar, annular wall 436 which is spaced a distance $b$ above the shoulder 433 of the pat slightly less than the distance $a$ between the top of the embossed pat and inner surface of the blister sheet.

When the package is inverted (FIG. 15), the flat shoulder 433 of the pat will engage the flat wall 436 of the blister sheet and support the pat so that the embossed surface thereof will remain out of engagement with the blister sheet, and thereby avoids any danger of surface-design damage that such engagement and/or contact might otherwise produce. The shoulder 433 and wall 436 in the embodiment illustrated are substantially coplanar and extend parallel to the flat bottom of the pat and the base 423. These flat surfaces thereby provide a substantial weight-supporting area when the package is inverted, and the pat can be completely supported by the shoulder thereof without causing any aesthetically unacceptable marring of the surface of the shoulder. Depending upon the contacting areas of the shoulder and the mating wall of the cover, configurations other than coplanar could be used.

The particular blister sheet illustrated is formed with outwardly extending decorative and strengthening ribs 437 around the circumference thereof, but the surface of the sheet could be smooth if desired.

It will be understood that the package 420 could easily be modified to hold and protect embossed pats having other configurations. For example, pats similar to the pats 321 which have a rectangular bottom periphery could also be provided with a flat perimetric shoulder for engaging a correspondingly shaped flat wall formed in the blister sheet. Further, because of the substantial contacting area provided by the flat, mating surfaces of the pat and the blister, the pat could be supported in an inverted condition without damage even if the flat surface of the pat and/or the blister sheet did not extend around the entire periphery thereof. For example, flat surfaces could be provided at spaced locations around the periphery of the pat.

The peripheral flat-shoulder areas are designed to:

a. aesthetically blend like a picture-frame around, and thus even accentuate the aesthetics of the embossed surfaces;

b. function as a non-marrable weight-bearing surface, and c. cooperate with a co-planar surface of a covering blister-sheet; and d. maintain the embossed surfaces of a butter pat free and clear of contact with its covering package, represent a surprising discovery, even to one skilled in the art such as I, in the art of packaging butter with embossed surfaces.

I claim:

1. A pat package for a soft food such as butter comprising a plate having a substantially flat bottom wall, a soft food pat having a flat bottom supported on said bottom wall and having a surface above said bottom wall equipped with embossments defining ridges and valleys, and a relatively rigid-bodied hard-surfaced type blister cover supported and secured on said bottom wall about said pat flat bottom, said cover being spaced from said embossments a distance great enough to avoid pressures from too close spacing but small enough to avoid unfavorable impact pressures due to movement of the butter, said cover having a shape conforming generally to the collective shape of said ridges but not to said valleys; said embossments of the pat being engageable with the cover when the package is inverted, the cover being shaped to contact, when the package is inverted, a surface area of said ridges of from about 10% to about 25% of the total surface area of both the ridges and the valleys.

2. The package of claim 1 in which said cover is spaced from said embossments a distance of the order of about 1/16 inch to about ¼ inch.

3. The package of claim 1 in which said cover has a thickness of at least about 0.007 inch.

4. The package of claim 1 including a soft, non-stiffening wrapper covering the embossments of the pat and conforming to the surfaces thereof.

5. A package for butter and the like comprising a flat plate and a relatively rigid-bodied hard-surfaced type blister covering supported and secured on said plate and containing a butter pat having a flat base supported on said plate and a multi-cubic dimensioned embossed surface on the pat top side, said embossed surface being bare and devoid of any surface-contacting surface-conforming wrapper and the embossments of said surface being structured without regard to dependence on their own designs for protection against in transit pressures while enroute through the channels of trade but relying on contacts between the outermost points of said embossments and said covering, said covering being thermo-formed to the general outermost shape of said surface, and substantially conforming to an envelope of said surface defined by the outermost ppoints of said embossments and not to the cubic details of said embossments, the embossments being engageable with the covering when the package is inverted, said covering being shaped to contact, when the package is inverted, from about 10% to about 25% of the total cubic area of said embossed surface without substantially obstructing the passage of air between said embossed surface and the inner surface of said covering while offering a shape-nesting but not surface-nesting surface on and/or in which said embossed surfaced pat can nest itself when traveling in shipment embossed-side-down and at the same time providing an air space between said embossed surface and said covering when said pat is traveling in shipment embossed-side-up; said air space being a distance great enough to avoid pressures from too close spacing but small enough to avoid unfavorable impact pressures due to movement of the butter.

6. A pat package for a soft food such as butter comprising a plate having a substantially flat bottom wall, a pat having a flat bottom surface supported on said bottom wall, an upper embossed surface, and a shoulder extending outwardly from the embossed surface, and a relatively rigid-bodied hard-surface type blister cover supported and secured on said bottom wall about said pat flat bottom, said cover having an upper portion vertically spaced upwardly from the top of the embossed surface and a wall extending generally laterally outwardly from the upper portion of the cover and vertically spaced above the pat shoulder, the vertical space between the pat shoulder and the outwardly extending wall of the cover being less than the vertical space between the top of the cover and the top of the embossed surface whereby when the package is inverted the pat shoulder engages the outwardly extending wall of the cover.

7. The package of claim 6 in which the shoulder of the pat extends around the periphery of the pat and the wall of the cover extends around the periphery of the cover.

8. The package of claim 6 in which the shoulder of the pat and the wall of the cover extend substantially pparallel to said flat bottom wall.

9. The package of claim 6 in which the pat includes a perimetric side wall extending downwardly from the shoulder to the bottom of the pat and the cover includes a perimetric wall extending downwardly from said wall toward said plate.

10. The package of claim 6 in which the pat is generally hemispherical in shape and the shoulder is generally annular.

11. A method of packaging surface embossed butter pats comprising the steps of installing a flat bottomed, embossed top surface butter pat on a generally flat bottom plate, forming a relatively rigid plastic blister cover so that the cover has a pat-supporting surface which is shaped to contact from about 10% to about 25% of the total embossed surface of the butter when the bottom plate and the pat are positioned so that the pat is embossed-side-down, the pat-supporting surface of the cover not conforming to the details of the embossed surface, mounting and securing the cover over said bottom plate and the butter pat so that the lowest points of said blister are generally in contacting relation with said bottom plate perimetrically about said pat, and the cover provides a head space above said pat when said pat is positioned embossed-side-up, enclosing the cover with an outer enclosure, and transporting the outer enclosure and its contents through channels of trade; said head space being a distance great enough to avoid pressures from too close spacing but small enough to avoid unfavorable impact pressures due to movement of the butter.

* * * * *